N. P. PETERSEN.
DIE HEAD.
APPLICATION FILED OCT. 12, 1916.
1,249,819.
Patented Dec. 11, 1917.
2 SHEETS—SHEET 1.
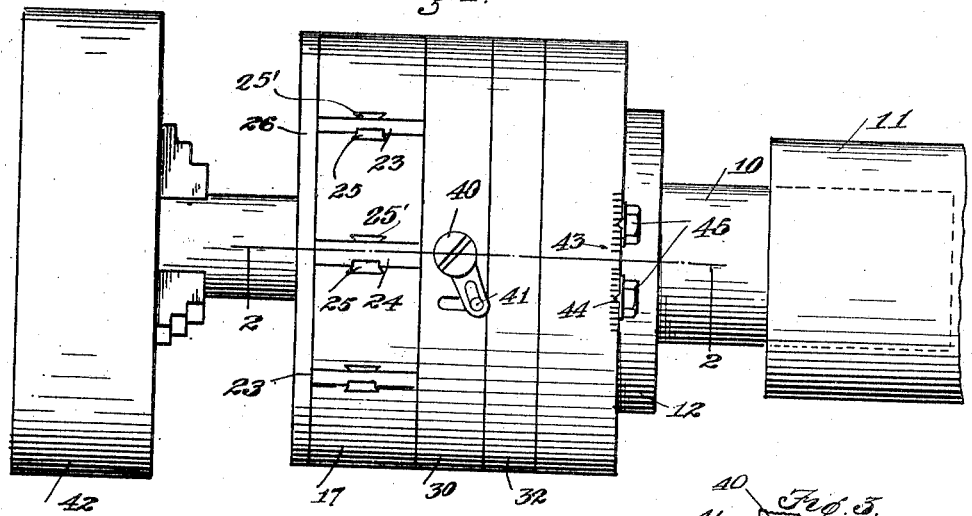
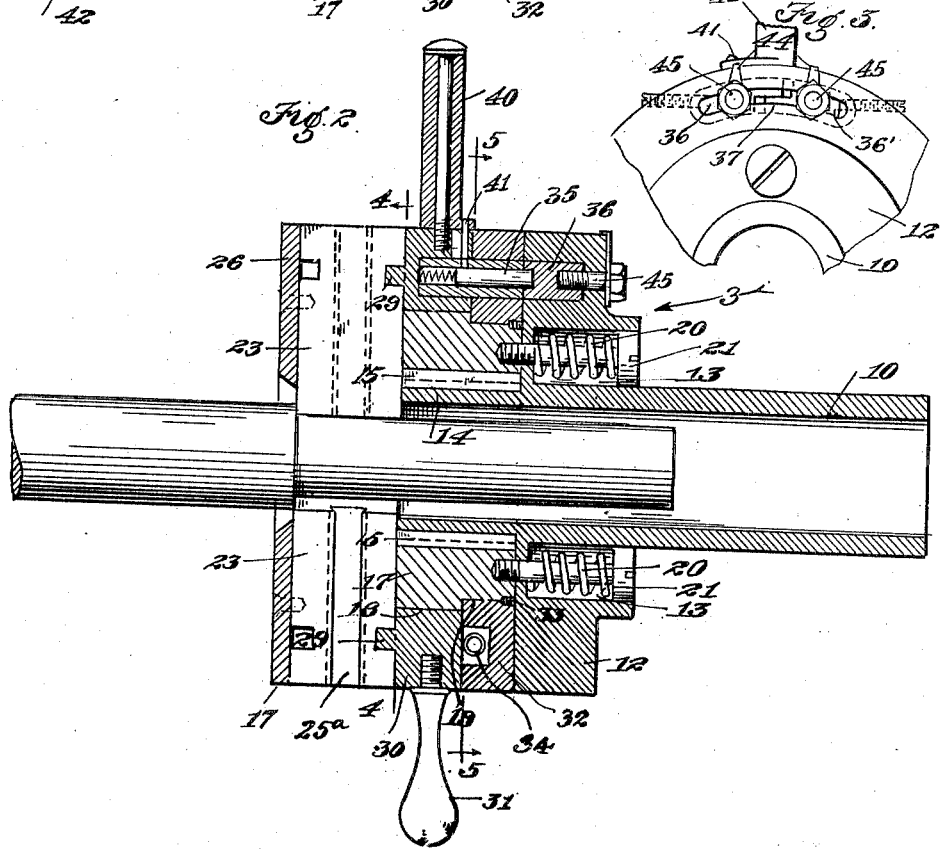
Inventor,
Nels P. Petersen.
by Hazard Berry & Miller
Attys.

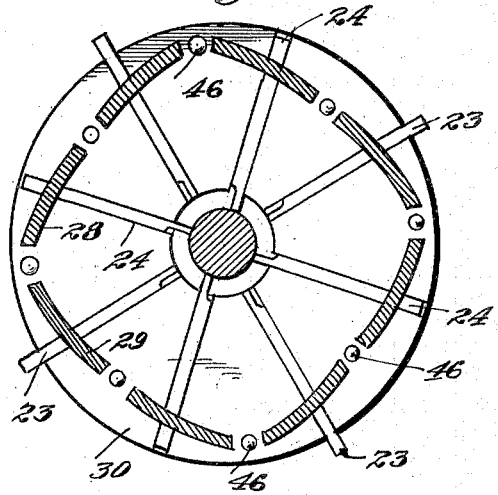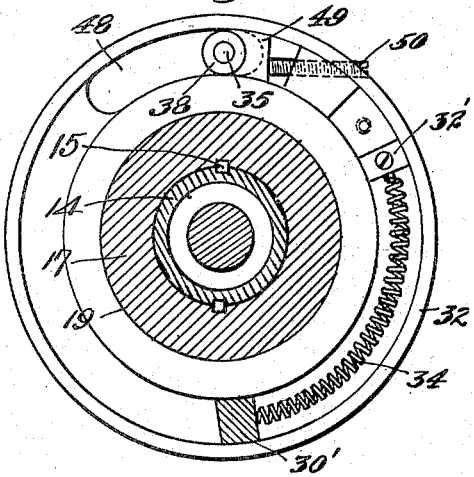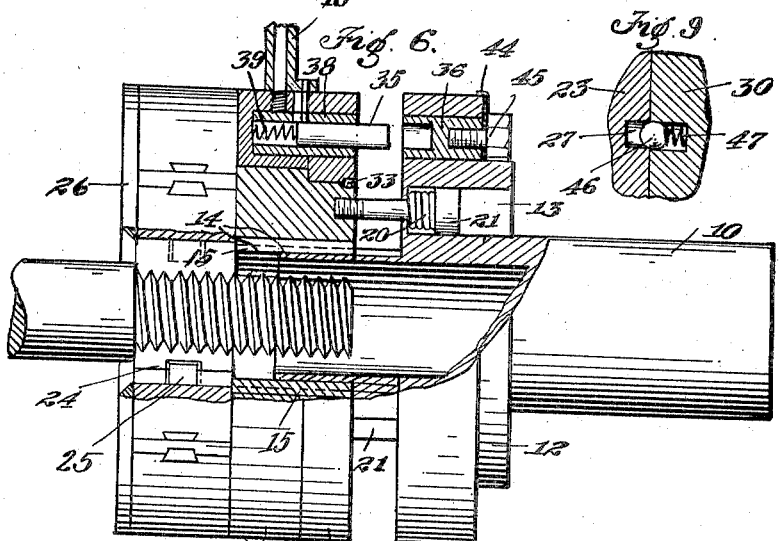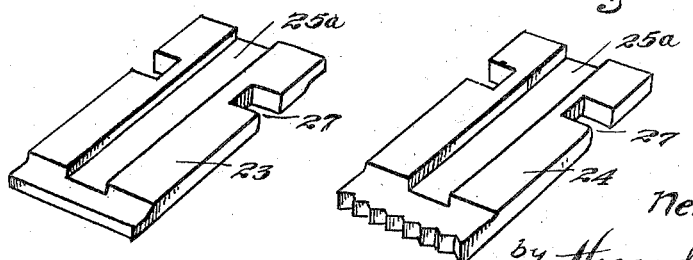

UNITED STATES PATENT OFFICE.

NELS P. PETERSEN, OF LOS ANGELES, CALIFORNIA.

DIE-HEAD.

1,249,819.   Specification of Letters Patent.   Patented Dec. 11, 1917.

Application filed October 12, 1916.   Serial No. 125,303.

*To all whom it may concern:*

Be it known that I, NELS P. PETERSEN, a citizen of the United States, residing at Los Angeles, in the county of Los Angeles and State of California, have invented certain new and useful Improvements in Die-Heads, of which the following is a specification.

This invention relates to a cutter head adapted to be used upon machine tools and particularly pertains to a combined cutter and die for use in the manufacture of bolts, screws and the like.

It is an object of this invention to provide a cutter head which may be mounted to operate upon a lathe or screw machine and which will act in a semi-automatic manner to turn the body of the screw down to a given diameter and thereafter cut threads along this turned portion.

Another object of this invention is to provide a thread cutter or screw forming machine having turning tools and threading tools in the same circumferential plane so that screw threads may be cut clear up to the shoulder formed by the turning tools.

Another object is to provide the turning tools and die bits within a single head so that they may be compactly and rigidly secured and may be readily actuated to alternately move toward and away from the work.

Another object is to provide simple manually operated means for retracting the turning tools and advancing the die bit in relation to the work and to provide automatically operating means for restoring the turning tools to their initial position and retracting the die bits.

Another object is to provide simple means for adjustably maintaining a given depth of cut upon the work and to positively insure that the turning tools and die bit will co-act in a manner to form a perfect thread.

Another object is to provide tools and bits of special configuration so that they may be slidably mounted within the head without danger of becoming wedged or disengaged from their seats.

It is a further object to provide a cutter head adapted to perform the above functions and which is comparatively simple in its construction and may be readily and positively operated.

Other objects will appear hereinafter.

The invention is illustrated, by way of example, in the accompanying drawings in which:

Figure 1 is a view in plan and elevation illustrating the cutter head as mounted within the tail stock of a lathe and further illustrating a piece of work stock secured within a revolving chuck to project within the cutter head.

Fig. 2 is a view in longitudinal section as seen on the line 2—2 of Fig. 1 illustrating the correlation existing between the component parts of the cutter head and further shows the turning tools as acting upon the work.

Fig. 3 is a fragmentary view in end elevation illustrating the manner in which adjustment is afforded the tools and bits to determine the depth of cut they shall make.

Fig. 4 is a view in transverse section as seen on the line 4—4 of Fig. 2 viewed in the direction of the arrows and illustrating the radial mounting of the tools and bits and the manner in which these members are reciprocated in relation to the work.

Fig. 5 is a view in transverse section as seen on the line 5—5 of Fig. 2 and particularly illustrates the mounting of a circumferential coil spring which is provided to rotate the movable portion of the head when released.

Fig. 6 is a view in elevation with parts broken away to illustrate the manner in which the cutter head is released after the threads have been completed.

Fig. 7 is a view in perspective illustrating one of the turning tools.

Fig. 8 is a view in perspective illustrating one of the die bits.

Fig. 9 is a fragmentary view in section illustrating the manner in which each of the cutters is initially held within the cutter head prior to actuation.

Referring more particularly to the drawings, 10 indicates the tubular shank of a cutter head and which is here shown as mounted against rotation within a tail stock 11 of the lathe. The shank 10 is formed with an enlarged annular shoulder 12 which occurs mid-way the length of the shank and within which a series of cylindrical pockets 13 are formed. The pockets are spaced equal distances around the shank. A tubular extension 14 is formed upon the inner end of the shank and is provided with keys 15 which slidingly spline the cutter head upon the tubular extension 14.

Cutter head 17 is cylindrical in shape, of an outside diameter equal to the diameter of the shoulder 12 and is formed with an extension having two annular faces of reduced diameters 18 and 19. The face 19 terminates against the square face of the shoulder 12 and normally is held thereagainst by means of coil springs 20 which are positioned within the recesses 13 and which bear upon the rear faces of the heads of bolts 21. These bolts are threaded and are secured within the cutter head extension. The enlarged portion of the cutter head is formed with a series of radial slots, here shown as eight in number, within which turning tools 23 and die bits 24 are alternately mounted.

The turning tools 23 are formed with straight grooves 25ª extending along their front face and adapted to engage keys 25 detachably mounted within recesses 25′ formed along the radial grooves in the cutter head. The die bits are formed in a similar manner and thus the tools and bits may be freely reciprocated without danger of being thrown out of alinement. The recesses 25′ within each face of the radial slots permit the tools to be interchanged and the keys reversed when left hand threads are to be cut. The outer ends of the slots are covered by an annular plate 26 which prevents chips and dirt from getting into the sliding ways provided for the tools.

As a means for producing reciprocation of the tools and bits each of them is formed with a transverse slot 27, one in each edge, which is engaged by one of the arcuately shaped cams 28 or 29. The cams 28 are provided to engage the die bits and the cams 29 are provided to engage the turning tools. Reference being had to Fig. 4, it will be seen that the cams are arranged in pairs oppositely and outwardly diverging from each other. These cams are formed integral with a rotatable actuating cam sleeve 30 which is mounted upon the annular face 18 of the cutter head and which may be rotated by handle 31 to advance and retract the various tools and bits simultaneously. A filler ring 32 is disposed upon the face 19 of the cutter head and between the shoulder 12 and the cam sleeve 30. This member is secured against rotation by a series of set screws 33 which are threaded into both the ring and face 19, thus forming a fixed channel within which the actuating cam sleeve 30 may be rotated. The cutters are initially engaged by balls 46 held by spring 47, as shown in Fig. 9 of the drawings.

The actuating cam sleeve 30 is adapted to be held in a position to cause the advance of the turning tools by a circumferentially disposed spring 34 which is adjustably secured at one end to the filler ring 32 by a lug 32′ and at the other end against a lug 30′ on the actuating cam sleeve 30. The advance and retraction of the tools and bits is limited by a pin plunger 35 which is adapted to alternately engage a recess within a lock block 36 or 36′, as shown in Fig. 3 of the drawings. This block may be adjusted along an arcuate slot 37 to determine the movement of rotation allowed the cam sleeve 30. The pin plunger 35 is slidably mounted within a bushing 38 and is held in its outermost position by a spring 39. The bushing 38 and the pin 35 are free to move along an arcuate slot 48 formed through the cam sleeve 30. As a means for relieving the pin from strain when the head rotates by means of the spring 34, an adjustable block 49 is mounted at one end of the slot 48 and adjustably held by a set screw 50, as shown in Fig. 5 of the drawings. Retractive movement of the plunger may be effected by the rotation of a handle sleeve 40 which acts to move a pin 41 secured to the rear end of the plunger 35. Thus it will be seen that when the use of the turning tools is not desired, the plunger 35 must be retracted and the actuating ring rotated until the plunger registers with the lock block 36′, thus retracting the turning tools and advancing the die bits to make a cut.

In operation, the round work stock is secured within a chuck 42 and rotated thereafter. The tail stock of the lathe will be advanced to cause the turning tools to cut the diameter of the work stock down as determined by graduation 43 marked along the shoulder 12 and adapted to register with pointers 44 mounted to move with lock bolts 45 which clamp the lock blocks 36 and 36′ in position, as shown in Fig. 3 of the drawings. As the cutter head is advanced the work stock will be turned down to a desired diameter and in condition to be threaded. This operation is performed by rotating the handle sleeve 40 by the pin 41 to retract the plunger 35 after which the actuating cam sleeve 30 may be rotated by the handle 31. This action will cause the cam faces of lugs 28 and 29 to pass along the slots 27 in the cutter and retract the turning tools while advancing the die bits. After this adjustment has been made the cutter head may be again advanced along the previously turned work, thus threading it. When the proper length of thread has been cut by the die bits, the tail stock may be retracted. When this movement takes place the cutter head and shoulder 12 upon the tubular shank will be separated due to the resistance of the die bits to the threads on the work stock and at the time of separation the plunger 35 will be withdrawn from the recess in the lock block 36. When the plunger has been thus released the spring 34 will quickly rotate the actuating cam sleeve 30 to retract the die bits and advance the turning tools, thus freeing the cutter head from the work and preparing the device for the reception of another piece of work stock. The bushing 38 will strike the block 49 and the pin will thereafter fall into the bore in block 36.

It will thus be seen that the cutter head here provided may be actuated in a simple manner to turn a piece of work stock down to a given diameter, after which the turning tools may be readily relieved and die bits set at a predetermined dimension to thread the work. It will be further noted that the head will act automatically to release the work stock from the dies and prepare it for future operations.

The screw threading dies and the turning tools or cutters are in the same circumferential plane and are interchangeable and reversible, so that a given right or left hand thread may be cut clear to the shoulder formed by the turning tools, and the cutters and dies are connected together to be moved in and out in opposite directions simultaneously by a simple movement of a handle.

I claim:

1. A cutter head, comprising a body portion, a series of turning tools radially mounted therein, a series of die bits radially mounted and alternately disposed in relation to said turning tools, means for normally maintaining the turning tools in operative position in relation to a piece of work, and means for alternating the position of the tools and bits in relation to said work, and means for automatically relieving the die bits from the work when the thread has been cut.

2. A cutter head, comprising a body portion, a series of turning tools reciprocably mounted thereupon, a series of die bits reciprocably mounted upon said body portion, and means for alternately disposing the tools and bits in cutting relation to a piece of work, the turning tools and die bits being in the same circumferential plane so that the bits will cut threads to the shoulders formed by the tools.

3. A cutter head, comprising a body member, a series of turning tools reciprocably mounted upon said member, a series of die bits reciprocably mounted upon said member, means for alternately retracting and advancing said tools and bits simultaneously, and means for maintaining said tools and bits in their alternate position, the turning tools and die bits being in the same circumferential plane so that the bits will cut threads to the shoulders formed by the tools.

4. A die head, comprising a body member, a series of turning tools radially mounted for reciprocal movement thereupon, a series of die bits mounted upon said body member for reciprocal movement, manually operated means for retracting the turning tools and advancing the die bits in relation to a piece of work, and automatically operating means for retracting the die bits and restoring the turning tools to their original position.

5. A cutter head, comprising a body member, a series of radially disposed turning tools and die bits mounted upon said member in alternate relation to each other, manually operated means for alternately reciprocating said tools and bits to advance one set into contact with a piece of work, and automatically operated means for restoring said tools and bits to their original position.

6. A die head, comprising a body member, a series of turning tools mounted for reciprocable movement thereupon, a series of die bits reciprocably mounted upon said body member, and adjustable means for regulating the depth at which the tools and bits will operate, the turning tools and die bits being in the same circumferential plane so that the bits will cut threads to the shoulders formed by the tools.

7. A die head, comprising a body member, a series of turning tools mounted for reciprocable movement thereupon, a series of die bits reciprocably mounted upon said body member, adjustable means for regulating the depth at which the tools and bits will operate, and means whereby the tools and bits may be alternately reciprocated to cut at the depth at which the adjusting mechanism is set, the turning tools and die bits being in the same circumferential plane so that the bits will cut threads to the shoulders formed by the tools.

8. A die head, comprising a body member, a series of turning tools mounted for reciprocable movement thereupon, a series of die bits reciprocably mounted upon said body member, adjustable means for regulating the depth at which the tools and bits will operate, means whereby the tools and bits may be alternately reciprocated to cut at the depth at which the adjusting mechanism is set, and means whereby the bits and tools may be locked in a rigid position during their cutting operations, the turning tools and die bits being in the same circumferential plane so that the bits will cut threads to the shoulders formed by the tools.

9. In a die head, a body member having radial slots and key ways extending from both sides of each slot, a series of turning tools and a series of threading tools interchangeably and reversibly fitting said slots and each having a longitudinally extending key way upon one side for registering with the slot key ways, and keys for the key-ways, the turning tools and threading tools being in the same circumferential plane, so that the threading tools will cut right or left threads to the shoulders formed by the turning tools.

In testimony whereof I have signed my name to this specification.

NELS P. PETERSEN.

Copies of this patent may be obtained for five cents each, by addressing the "Commissioner of Patents. Washington, D. C."